United States Patent
Chauvin et al.

(10) Patent No.: US 10,606,525 B1
(45) Date of Patent: Mar. 31, 2020

(54) COLOR TRANSFORMS FOR PRINT JOB PROCESSING

(71) Applicants: James Anthony Chauvin, Frederick, CO (US); Larry M Ernst, Longmont, CO (US)

(72) Inventors: James Anthony Chauvin, Frederick, CO (US); Larry M Ernst, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/276,013

(22) Filed: Feb. 14, 2019

(51) Int. Cl.
*G06F 3/12* (2006.01)
*H04N 1/60* (2006.01)

(52) U.S. Cl.
CPC .......... *G06F 3/1219* (2013.01); *G06F 3/1239* (2013.01); *G06F 3/1247* (2013.01); *G06F 3/1284* (2013.01); *H04N 1/6008* (2013.01); *H04N 1/6022* (2013.01)

(58) Field of Classification Search
None
See application file for complete search history.

(56) References Cited

U.S. PATENT DOCUMENTS

| | | | | |
|---|---|---|---|---|
| 5,317,426 A * | 5/1994 | Hoshino | ............... | H04N 1/6058 358/501 |
| 5,450,216 A * | 9/1995 | Kasson | ................ | H04N 1/6058 358/518 |
| 6,791,716 B1 * | 9/2004 | Buhr | ..................... | H04N 1/6075 358/1.9 |
| 6,823,083 B1 * | 11/2004 | Watanabe | ............ | H04N 1/6005 348/E9.053 |
| 6,956,581 B2 * | 10/2005 | Cui | ...................... | H04N 1/6058 345/589 |
| 7,251,058 B2 * | 7/2007 | Pop | ......................... | H04N 1/54 345/590 |
| 7,403,307 B2 | 7/2008 | Huang et al. | | |
| 7,663,641 B2 * | 2/2010 | Sloan | ....................... | H04N 1/60 345/589 |
| 8,233,191 B2 * | 7/2012 | Tsuchiya | .................. | H04N 1/54 358/1.9 |
| 8,395,831 B2 | 3/2013 | Qiao | | |

(Continued)

FOREIGN PATENT DOCUMENTS

JP 5699776 B2 4/2015

OTHER PUBLICATIONS

Royer MP, Houser KW, David A.; Chroma Shift and Gamut Shape; Going Beyond Average Color Fidelity and Gamut Area; US Dept of Energy; Oct. 2017.

(Continued)

*Primary Examiner* — Anh-Vinh T Nguyen
(74) *Attorney, Agent, or Firm* — Duft & Bornsen, PC

(57) ABSTRACT

Embodiments described herein utilize a color transform that maps input colors in print jobs to output colors of a printing system. The color transform defines colorant limits that vary based on where the input colors are represented within a color space. When a print job is processed using the color transform to generate rasterized image data, input colors in the print job are converted into output colors of the printing system where a colorant amount for printing each of the output colors is within the colorant limit defined by where its respective input color is represented in the color space.

13 Claims, 6 Drawing Sheets

(56) References Cited

U.S. PATENT DOCUMENTS

| | | | |
|---|---|---|---|
| 8,427,696 B2* | 4/2013 | Suzuki | H04N 1/6058 345/604 |
| 8,437,053 B2* | 5/2013 | Edge | H04N 1/6058 358/520 |
| 8,542,405 B2 | 9/2013 | Fischer et al. | |
| 8,634,117 B2 | 1/2014 | Fukuda et al. | |
| 8,675,255 B2 | 3/2014 | Fukuda et al. | |
| 8,861,028 B2* | 10/2014 | Suzuki | H04N 1/6058 358/1.9 |
| 9,403,373 B2 | 8/2016 | Arizono et al. | |
| 9,649,868 B2 | 5/2017 | Simoni et al. | |
| 9,994,053 B2 | 6/2018 | Schuppan | |
| 2004/0126009 A1* | 7/2004 | Takenaka | G06T 11/001 382/162 |
| 2005/0243119 A1* | 11/2005 | Kuhn | H04N 1/6055 347/19 |
| 2005/0243337 A1* | 11/2005 | Kuhn | H04N 1/6033 358/1.9 |
| 2005/0243339 A1* | 11/2005 | Kuhn | H04N 1/56 358/1.9 |
| 2006/0176400 A1* | 8/2006 | Shimizu | H04N 1/56 348/570 |
| 2007/0236761 A1* | 10/2007 | Sloan | H04N 1/6058 358/520 |
| 2007/0279658 A1* | 12/2007 | Ito | H04N 1/2307 358/1.9 |
| 2008/0007806 A1* | 1/2008 | Shirasawa | H04N 1/6058 358/520 |
| 2008/0259369 A1* | 10/2008 | Kanai | G06T 11/001 358/1.9 |
| 2009/0244664 A1* | 10/2009 | Kanai | H04N 1/6058 358/530 |
| 2009/0310157 A1* | 12/2009 | Wada | H04N 1/6058 358/1.9 |
| 2009/0316168 A1* | 12/2009 | Enjuji | G06K 9/00234 358/1.9 |
| 2011/0052051 A1* | 3/2011 | Takeshita | G06T 1/00 382/165 |
| 2012/0249633 A1* | 10/2012 | Tanaka | G01N 21/251 347/9 |
| 2014/0153009 A1* | 6/2014 | Kobayashi | G06F 3/1208 358/1.9 |
| 2016/0142693 A1 | 5/2016 | Kwon et al. | |
| 2017/0015107 A1 | 1/2017 | Arizono et al. | |

OTHER PUBLICATIONS

Sanyukta Sanjay Hiremath; A Study of High-Chroma Inks for Expanding CMYK Colorant Gamut; Rochester Institute of Technology RIT Scholar Works; May 2018.

* cited by examiner

COLOR TRANSFORMS FOR PRINT JOB PROCESSING

FIELD

This disclosure relates to the field of print job processing, and in particular, to color transforms used during the processing of print jobs.

BACKGROUND

Printing systems transform a print job into a printed output by applying colorant(s) to mark a printable medium, such as paper. In order to represent colors specified in the print job, printing systems utilize different colorants that are applied to the medium in different ratios. For instance, a Cyan, Magenta, Yellow, Key black (CMYK) printing system utilizes combinations of 4 different colorants to represent the input colors specified in the print job as an output color.

The colors specified in the print job are often defined in a different color space than the printing system. During the printing process, the printing system performs a color conversion to convert colors specified in the print job from the input color space of the print job to the output color space of the printing system.

An inkjet printing process often has to limit the amount of colorants placed (e.g. applied) on the medium in order to allow the medium to achieve a desired print quality and/or desired drying of the printed medium. Typically, limiting the amount of colorants is performed using fixed digital count limits in the output color space. For instance, a digital count limit in the CMYK output color space for a specific print engine and dryer combination may limit all colorant printing values to less than 260% C+Y+M+K. While this type of methodology may be effective to ensure that the printed output is acceptable, the print quality may suffer due to the inflexible methodology of a fixed colorant limit for printing. Further, the use of such fixed colorant limits may make it difficult to utilize colorants efficiently, which can increase the operating cost of a printing system.

Thus, there is a need to improve the print quality of a printing system, while ensuring that colorants used during the print process are used efficiently.

SUMMARY

Embodiments described herein utilize a color transform that maps input colors in print jobs to output colors of a printing system. The color transform defines colorant limits that vary based on where the input colors are represented within a color space. When a print job is processed using the color transform to generate rasterized image data, input colors in the print job are converted into output colors of the printing system, where a colorant amount for printing each of the output colors is maintained within the colorant limit defined by where its respective input color is represented in the color space.

One embodiment comprises an apparatus that includes a memory and a processor. The memory stores a color transform that maps input colors of print jobs to output colors of a printing system, where each of the input colors are assigned to one of a plurality of regions of a color space, and where the colorant limit for at least two of the plurality of regions is different. The processor is communicatively coupled to the memory. The processor receives a print job, processes the print job into rasterized image data using the color transform to convert input colors in the print job to the output colors of the printing system, where a colorant amount for printing each subset of the output colors is maintained within the colorant limit of one of the plurality of regions associated with its respective input color. The processor transmits the rasterized image data.

Another embodiment comprises a method of performing color conversion using variable colorant limits. The method comprises storing a color transform that maps input colors in print jobs to output colors of a printing system, where each of the input colors are assigned to one of a plurality of regions of a color space, and where each of the plurality of regions has a colorant limit for printing a subset of the output colors. Further, the colorant limit for at least two of the plurality of regions are different. The method further comprises receiving a print job, and processing the print job into rasterized image data using the color transform to convert input colors in the print job to the output colors of the printing system. A colorant amount for printing each subset of the output colors is maintained within the colorant limit of one of the plurality of regions associated with its respective input color. The method further comprises transmitting the rasterized image data.

Another embodiment comprises a non-transitory computer readable medium embodying programmed instructions which, when executed by a processor, direct the processor to store a color transform that maps input colors in print jobs to output colors of a printing system. Each of the input colors are assigned to one of a plurality of regions of a color space. Each of the plurality of regions has a colorant limit for printing a subset of the output colors. Further, the colorant limit for at least two of the plurality of regions are different. The instructions further direct the processor to receive a print job, and to process the print job into rasterized image data using the color transform to convert input colors in the print job to the output colors of the printing system, where a colorant amount for printing each subset of the output colors is maintained within the colorant limit of one of the plurality of regions associated with its respective input color. The instructions further direct the processor to transmit the rasterized image data.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

As discussed previously, the inkjet printing process often has to limit the amount of colorants placed onto the medium. The medium (e.g., print medium) may be paper, textile, plastic or any substrate suitable for printing. Colorants may be ink, paint or other materials suitable for application to the medium. The units of colorant limit and colorant amount may be expressed as volume, mass, digital count or percent as a matter of design choice. Digital count may be a value that controls the ejection of colorant by the nozzle. Percent may refer to a normalized amount of colorant. Fixed colorant limits like those discussed previously may result in some areas in the color space that could use more colorant amount for improved print quality while perhaps overloading the medium with colorant amounts in other areas of the color space. This is caused in part by the different spectral absorption characteristics of the primary colorants (e.g., the colorants applied by the printer) used in the printing process. Further, the dryer technology used and/or the spectral characteristics of the dryer may also be a factor.

In the embodiments described herein, the colorant limits imposed during the printing process vary based upon which one of a plurality of regions of a color space represents a particular input color in a print job. For instance, the printing system may be more effective at drying the printed output of some input color hues over other input color hues based on the spectral properties of the colorants, the dryer, and/or the drying technology used. In another example, the spectral absorption characteristics of the colorants may vary the chroma of the printed output based on colorant amount, which can be mitigated by selecting colorant amounts that maximize chroma while remaining within the colorant drying limit for the medium. When the colorant amount is less than the colorant drying limit while maximizing chroma of the printed output, less colorant is used during the printing process.

Figure 1:
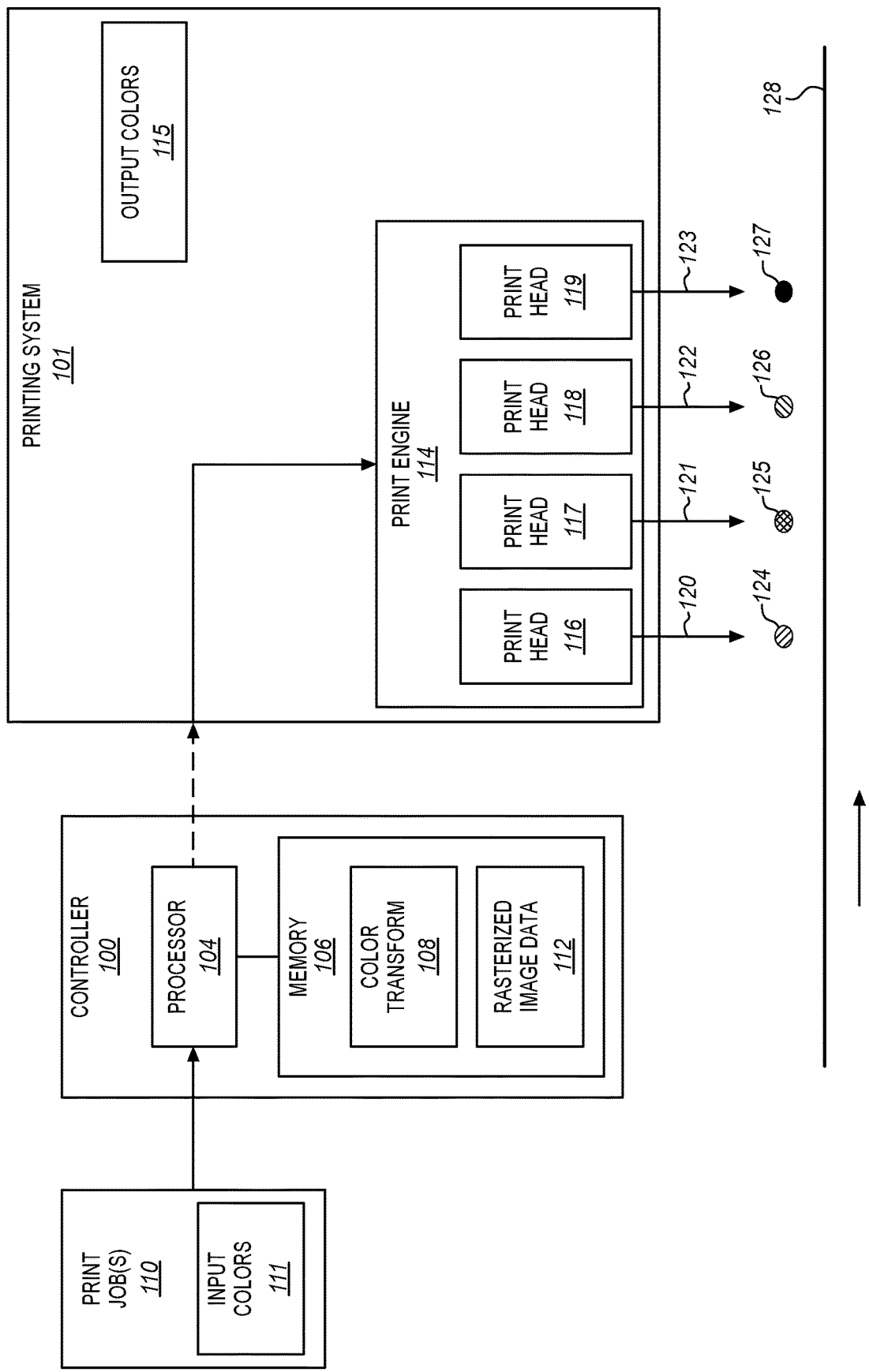
FIG. 1 is block diagram of a controller and a printing system in an illustrative embodiment.

FIG. 1 is block diagram of a controller 100 (i.e., an apparatus) and a printing system 101 in an illustrative embodiment. In this embodiment, controller 100 includes one or more processors 104 that are communicatively coupled to a memory 106. Memory 106 stores a color transform 108 that is used by controller 100 to convert print jobs 110 into rasterized image data 112 during a process to print print jobs 110.

In this embodiment, color transform 108 is configured to map input colors 111 in print jobs 110 to output colors 115 of printing system 101. In the embodiments described herein, input colors 111 of print jobs 110 are assigned to one of a plurality of regions of a color space, where each of the plurality of regions has a colorant limit for printing a subset of output colors 115 of printing system 101. The color space and the plurality of regions may have a plurality of dimensions such as 3 dimensions. Further, the colorant limits for at least two of the plurality of regions may be different. The assignment of the input colors may be performed by mapping each of the input colors into the color space and determining which one of the plurality of regions each of the mapped input colors corresponds to.

In one example, input colors 111 of print job 110 may be assigned to a Red Green Blue (RGB) color space, which is segmented into a plurality of regions which have two or more different colorant limits. When color transform 108 is used to convert input colors 111 of print jobs 110 into output colors 115 of printing system 101, the colorant amounts used for the printing of print job 110 vary based on where input colors 111 of print job 110 are represented in the RGB color space. The variation in the colorant amounts is desired because colorants 124-127 used by printing system 101 have different absorption characteristics which when applied to the medium in combination achieve the desired output color.

In another example, input colors 111 of print job 110 may be assigned to a CIELAB color space, which is segmented into a plurality of regions which have two or more different colorant limits. When color transform 108 is used to convert input colors 111 of print jobs 110 into output colors 115 of printing system 101, the colorant amounts used for the printing of print job 110 vary based on where input colors 111 of print job 110 are represented in the CIELAB color space. The variation in the amounts of colorants 124-127 is desired, because colorants 124-127 used by printing system 101 (e.g., CMYK) have different spectral absorption characteristics from each other. Colorants 124-127 may be all of colorants 124-127 used by the printing system 101 or a subset of them. A high-level discussion of the different spectral absorption characteristics of CMY colorants and how the differences may affect the chroma of a printed output is outlined below.

When printing system 101 utilizes CMYK for colorants 124-127, hues of red are formed on medium 128 using a combination of the yellow colorant and the magenta colorant. The spectral absorption of the combination is nearly a maximum between 400 nanometers (nm) to 600 nm. Near 400 nm, the spectral absorption of the yellow colorant allows some blue light to be reflected from medium 128. Near 600 nm, the spectral absorption of the magenta colorant allows some green light to be reflected from medium 128. The amount of undesired light reflected from medium 128 is minimal. For example, empirical testing for one printer system has shown that the colorant limit for printing hues of red may be set close to 200%.

Hues of green are formed using combinations of the yellow colorant and the cyan colorant. The spectral absorption of the combination is nearly a maximum between 400 nm to 500 nm. Near 400 nm, the spectral absorption of the yellow colorant allows some blue light to be reflected from medium 128. Near 600 nm, the spectral absorption of the cyan colorant allows a significant amount of green light to be reflected from medium 128, which limits the chroma. For example, empirical testing for one printer system has shown that a 140% colorant limit for hues of green may maximize the chroma.

Hues of blue are formed using the magenta colorant and the cyan colorant. Between 400 nm and 500 nm, a significant portion of the blue light reflected from medium 128 is absorbed by the magenta colorant. From 500 nm to 700 nm, the absorption is nearly a maximum, which reduces the green light and the red light reflected from medium 128. For example, empirical testing for one printer system has shown that a 160% colorant limit may achieve maximum chroma for hues of blue.

A colorant limit for each of the regions 402-404 for printing system 101 may be determined (e.g., by empirical testing prior to receiving the print job 110) to achieve one or more selected properties for regions 402-404. The selected properties may be any combination of maximum chroma, minimized colorant amount applied to the medium, and proper drying (e.g., the printed medium will exit the dryer and not be wet). The parameters of printing system that may be considered in the determination include any combination of a selected print engine, medium, colorants, print speed settings, dryer and dryer settings.

Referring again to FIG. 1, memory 106 stores rasterized image data 112, which is generated by the processing of print jobs 110 using color transform 108. Rasterized image data 112 may be sent (e.g., transmitted). For example, the rasterized image data 112 may be transmitted to a print engine 114 of printing system 101. Print engine 114 may receive the rasterized image data 112 for printing rasterized image data 112 onto a medium 128. Print engine 114 may include, for example, print heads 116-119. A dryer may be contained in print engine 114 or implemented separately in print system 101. Print heads 116-119 include nozzles 120-123, respectively, which are able to discharge colorants 124-127 onto medium 128 to generate a printed output. For example, print heads 116-119 may jet CMYK colorants onto medium 128 as medium 128 moves in the direction of the arrow illustrated in FIG. 1. Although only four colorants 124-127 are illustrated with respect to printing system 101, printing system 101 may utilize more or less number of colorants 124-127 in other embodiments.

While the specific hardware implementation of controller 100 is subject to design choices to perform the functionality described herein for controller 100, processor 104 in this embodiment comprises any electronic circuits and/or optical circuits that are able to perform the functionality. Processor 104 may include one or more Central Processing Units (CPU), Graphics Processing Units (GPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc.

Memory 106 comprises any electronic circuits, and/or optical circuits, and/or magnetic circuits that are able to store data. For instance, memory 106 may be used to store color transform 108 and/or rasterized image data 112. Memory 106 may include one or more volatile or non-volatile Dynamic Random-Access Memory (DRAM) devices, FLASH devices, volatile or non-volatile Static RAM devices, magnetic disk drives, Solid State Disks (SSDs), etc. Some examples of non-volatile DRAM and SRAM include battery-backed DRAM and battery-backed SRAM.

Figure 2:
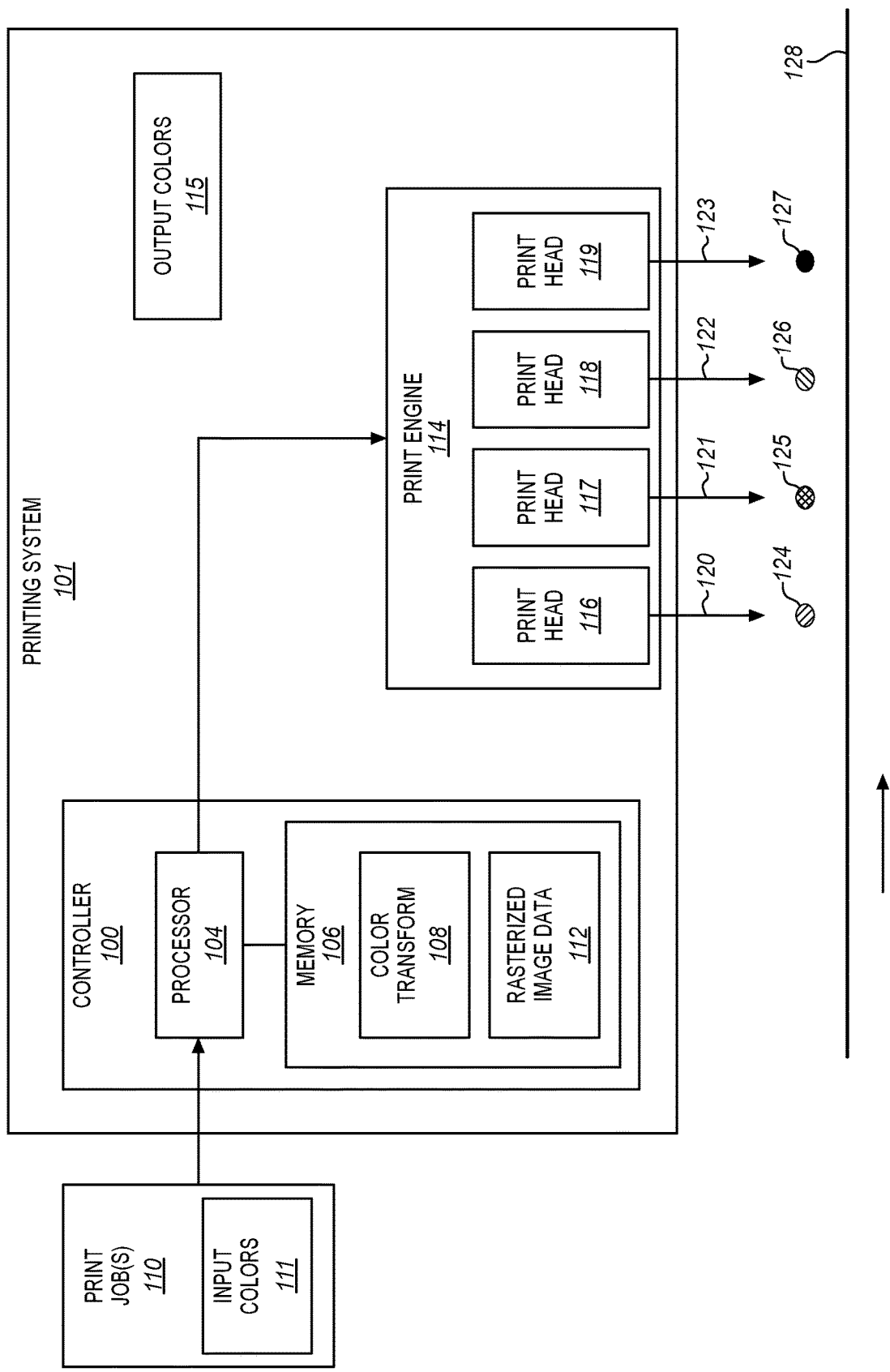
FIG. 2 is a block diagram of the printing system of FIG. 1 in another illustrative embodiment.

Although FIG. 1 depicts controller 100 as separate from printing system 101, controller 100 may be part of printing system 101 in some embodiments, as illustrated in FIG. 2.

Figure 3:
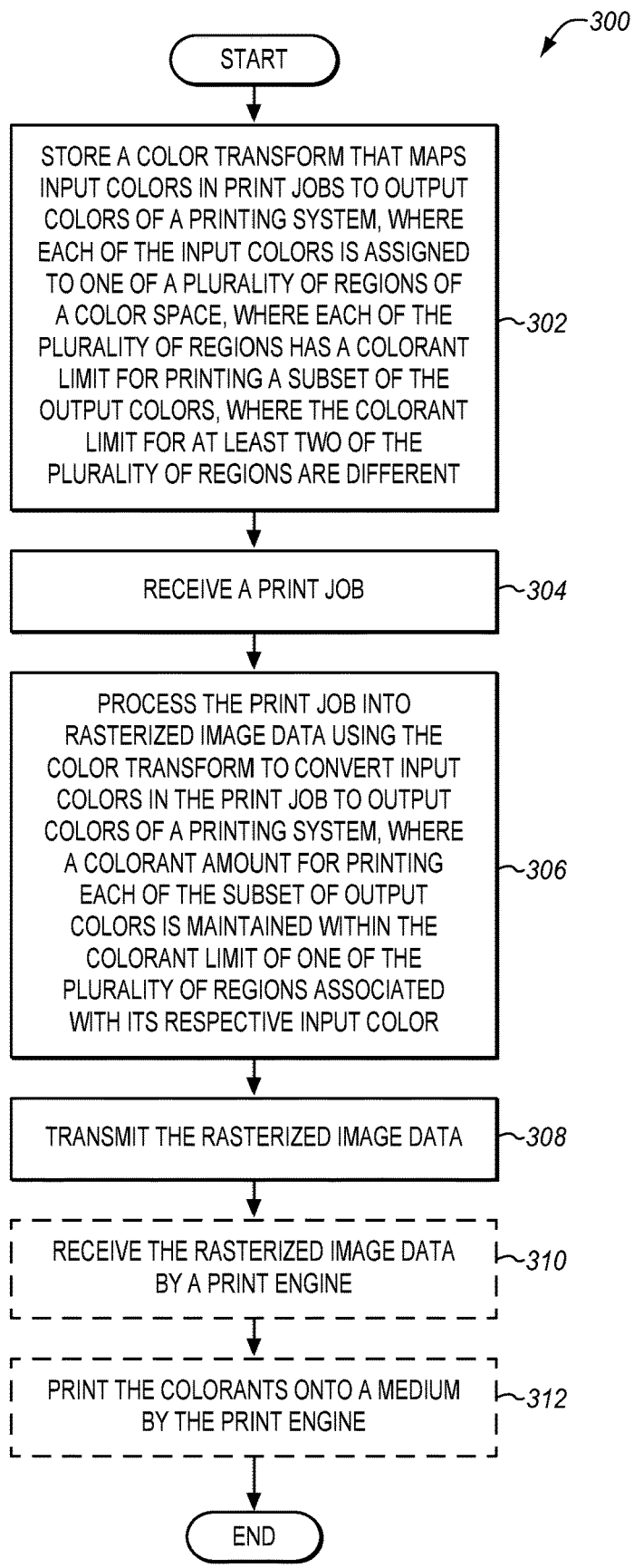
FIG. 3 is a flow chart of a method of performing color conversion using variable colorant limits in an illustrative embodiment.

Consider that controller 100 is operational and is ready to convert input colors 111 of print jobs 110 to output colors 115 of printing system 101. FIG. 3 is a flow chart of a method 300 of performing color conversion using variable colorant limits in an illustrative embodiment. Method 300 will be discussed with respect to controller 100 and printing system 101 of FIGS. 1-2, although method 300 may be performed by other systems, not shown. The steps of the flow charts described herein may include other steps that are not shown. Also, the steps of the flow charts described herein may be performed in an alternate order.

Processor 104 stores color transform 108 in memory 106, which is used to map input colors 111 in print jobs 110 to output colors 115 of printing system 101. Further, each of input colors 111 in print jobs 110 are assigned to one of a plurality of regions of a color space. Each of the plurality of regions has a colorant limit for printing a subset of the output colors of the printing system, and the colorant limit for at least two of the plurality of regions is different (see step 302).

Figure 4:
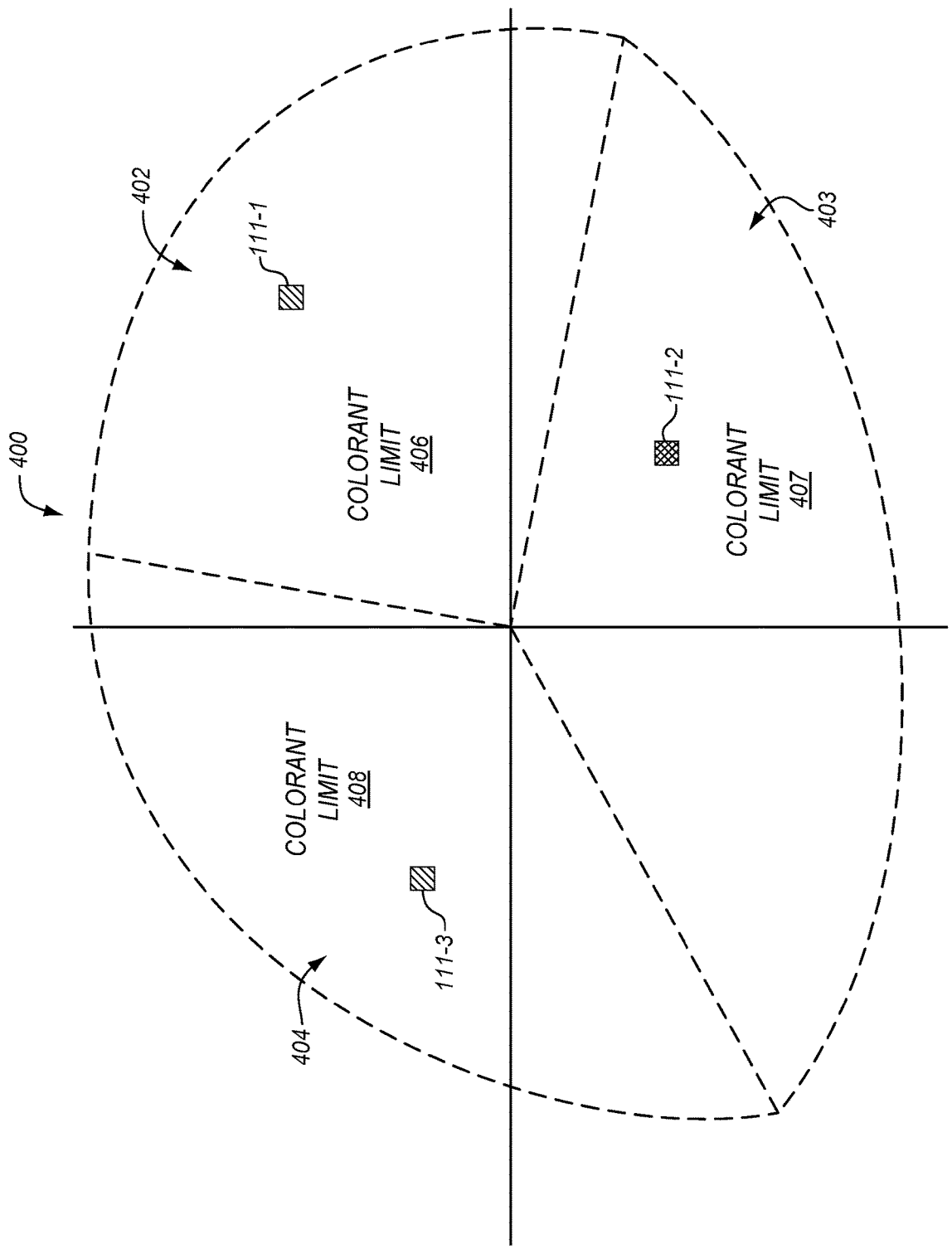
FIG. 4 depicts a color space for a print job in an illustrative embodiment.

FIG. 4 illustrates a color space 400 in an illustrative embodiment. In this embodiment, color space 400 is segmented into a plurality of regions 402-404. Although only three regions 402-404 are illustrated for color space 400 in FIG. 4, color space 400 may be segmented into any number of two or more regions as a matter of design choice. In this embodiment, regions 402-404 include colorant limits 406-408, respectively. Further, at least two of colorant limits 406-408 are different. In FIG. 4, an input color 111-1 is assigned to region 402 of color space 400, an input color 111-2 is assigned to region 403 of color space 400, and an input color 111-3 is assigned to region 404 of color space 400. Therefore, input color 111-1 has colorant limit 406 based upon its representation within region 402, input color 111-2 has colorant limit 407 based on its representation within region 403, and input color 111-3 has colorant limit 408 based on its representation within region 404.

Returning to FIG. 3, controller 100 receives print job 110 (see step 304), and performs a processing of print job 110 to generate rasterized image data 112 using color transform 108 to convert input colors 111 in print job 110 to output colors 115 of printing system 101 (see step 306). When converting input colors 111 of print job 110 to output colors 115 of printing system 101, a colorant amount for printing each of the subset of output colors 115 for printing system 101 is maintained within colorant limit 406-408 of regions 402-304 associated with their respective one of input colors 111. For example, to print input color 111-1, colorant limit 406 is used to limit the amount of colorants 124-127 applied to medium 128. In particular, the total amount of colorants 124-127 used to print input color 111-1 is less than or equal to colorant limit 406. In continuing with the example, to print input color 111-2, colorant limit 407 is used to limit the amount of colorants 124-127 applied to medium 128. In particular, the total amount of colorants 124-127 used to print input color 111-2 is less than or equal to colorant limit 407. Further for this example, to print input color 111-3, colorant limit 408 is used to limit the amount of colorants 124-127 applied to medium 128. In particular, the total amount of colorants 124-127 used to print input color 111-3 is less than or equal to colorant limit 408. Colorant amounts may be maintained within colorant limits by using algebraic equations or by embedding the colorant limits into an ICC profile color look up table for use with the color transformation. Colorant limits may be mapped to digital counts of the respective colorants (e.g. CMYK).

In response to processor 104 generating rasterized image data 112 by the processing of print job 110 using color transform 108, processor 104 transmits rasterized image data 112 (see step 308). In an optional embodiment, processor 104 may transmit rasterized image data to print engine 114. Print engine 114 receives the rasterized image data from processor 104 (see step 310), and may utilize print heads 116-119 to print colorants 124-127 onto medium 128 (see step 312).

In some embodiments, colorant limits 406-408 are selected to maximize a chroma for output colors 115 printed by printing system 101. For example, if input color 111-1 is a hue of red, then combinations of the yellow colorant and the magenta colorant may be used when printing system 101 utilizes CMYK colorants. As previously described with respect to the spectral absorption characteristics of this combination, a 200% value for colorant limit 406 may be used to achieve maximum chroma for the printed output of input color 111-1. In continuing with the example, if input color 111-3 is a hue of green, then combinations of the yellow colorant and the cyan colorant may be used when printing system 101 utilizes CMYK colorants. As previously described with respect to the spectral absorption characteristics of this combination, a 140% value for colorant limit 408 may be used to achieve maximum chroma for the printed output of input color 111-3.

In some embodiments, colorant limits 406-408 may also be selected to both maximize chroma while minimizing the amount of colorants 124-127 applied to medium 128 by printing system 101. For instance, in some cases, the chroma associated with printing a particular one of input color 111 may decrease or remain constant, even when applying an additional amount of colorants 124-127 onto medium 128. This additional amount of colorants 124-127 is wasteful, as the chroma may remain constant or decrease as a result. Therefore, color transform 108 may be designed with colorant limits 406-408 that may maximize chroma and/or also minimize the amounts of colorants 124-127 used by printing system 101.

In some embodiments, regions 402-404 represent secondary colors of printing system 101. For instance, the secondary colors of printing system 101 may be represented by utilizing two or more of colorants 124-127 applied to the medium. The secondary colors may, for instance, comprise Red, Green and Blue (RGB), while colorants 124-127 comprise CMYK.

Figure 5:
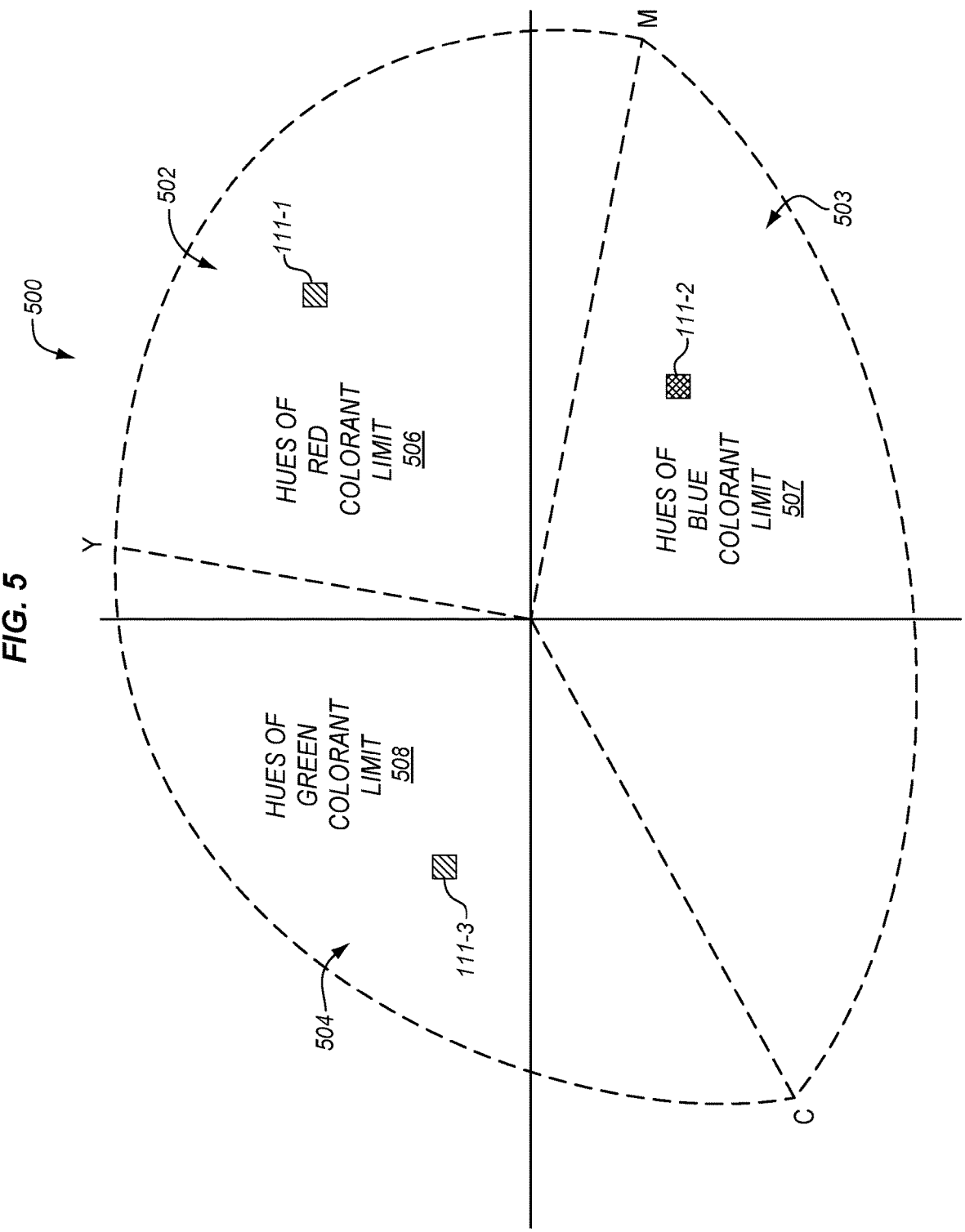
FIG. 5 depicts another color space for a print job in another illustrative embodiment.

FIG. 5 illustrates color space 500. Color space 500 represents RGB secondary colors and colorants 124-127, which are CMYK. In FIG. 5, region 502 comprises a hue of red, region 503 comprises a hue of blue, and region 504 comprises a hue of green. Since human visual perception is sensitive to hues of red, green and blue, having regions [502-504] represent red, green and blue allows color transforms better suited for human visual perception. When input color 111-1 is a hue of red (e.g., input color 111-1 is represented within region 502), colorant limit 506 is used to limit the amount of colorants 124-127 used to print input color 111-1. When input color 111-2 is a hue of blue (e.g., input color 111-2 is represented within region 503 of color space 500), colorant limit 507 is used to limit the amount of colorants 124-127 used to print input color 111-2. When input color 111-3 is a hue of green (e.g., input color 111-3 represented within region 504 of color space 500), colorant limit 508 is used to limit the amount of colorants 124-127 used to print input color 111-3.

Using variable colorant limits during the printing process that depend upon where the input colors in print jobs are represented within color space, the print quality (e.g., chroma) can be improved while simultaneously reducing the amounts of colorants used by a printing system, thereby reducing the operation cost of the printing system.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Figure 6:
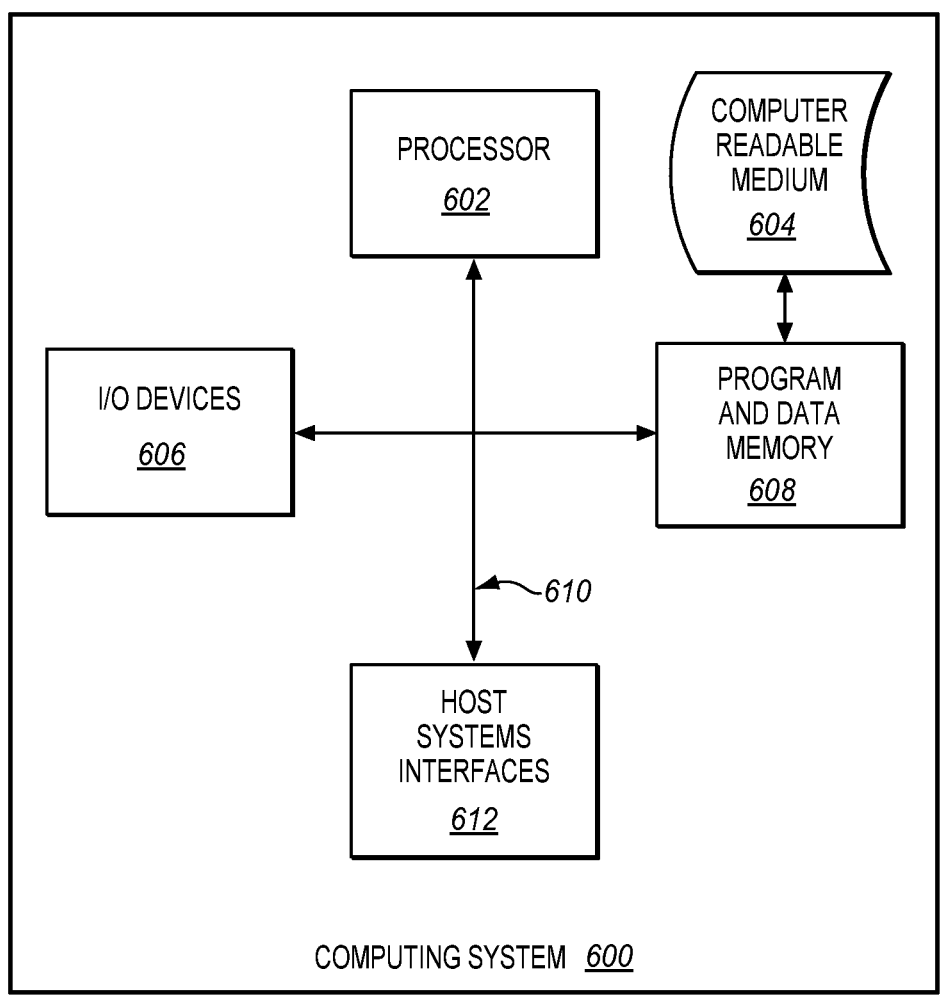
FIG. 6 is a block diagram of a computing system in which a computer readable medium may provide instructions for performing any of the functionality disclosed herein for the apparatus of FIG. 1, the printing system of FIG. 2, or the method of FIG. 3.

In one embodiment, the invention is implemented in software, which includes but is not limited to firmware, resident software, microcode, etc. FIG. 6 illustrates a computing system 600 in which a computer readable medium 604 may provide instructions for performing any of the functionality disclosed herein for controller 100, printing system 101, or method 300.

Furthermore, the invention can take the form of a computer program product accessible from computer readable medium 604 that provides program code for use by or in connection with a processor or any instruction execution system. For the purposes of this description, computer readable medium 604 can be any apparatus that can tangibly store the program for use by or in connection with the instruction execution system, apparatus, or device, including computing system 600.

Computer readable medium 604 can be any tangible electronic, magnetic, optical, electromagnetic, infrared, or semiconductor system (or apparatus or device). Examples of computer readable medium 604 include a semiconductor or solid-state memory, magnetic tape, a removable computer diskette, a random-access memory (RAM), a read-only memory (ROM), a rigid magnetic disk and an optical disk. Some examples of optical disks include compact disk-read only memory (CD-ROM), compact disk-read/write (CD-R/W) and DVD.

Computing system 600, suitable for storing and/or executing program code, can include one or more processors 602 coupled directly or indirectly to memory 608 through a system bus 610. Memory 608 can include local memory employed during actual execution of the program code, bulk storage, and cache memories which provide temporary storage of at least some program code in order to reduce the number of times code is retrieved from bulk storage during execution. Input/output (TO) devices 606 (including but not limited to keyboards, displays, pointing devices, etc.) can be coupled to the system either directly or through intervening IO controllers. Network adapters may also be coupled to the system to enable computing system 600 to become coupled to other data processing systems, such as through host systems interfaces 612, or remote printers or storage devices through intervening private or public networks. Modems, cable modem and Ethernet cards are just a few of the currently available types of network adapters.

Although specific embodiments were described herein, the scope is not limited to those specific embodiments. Rather, the scope is defined by the following claims and any equivalents thereof

What is claimed is:

1. An apparatus, comprising:
a memory configured to store a color transform that maps input colors of print jobs to output colors of a printing system, wherein each of the input colors are assigned to one of a plurality of regions of a color space, wherein the plurality of regions represents secondary colors of the printing system, wherein the secondary colors are represented utilizing two or more colorants of the printing system, wherein the colorants of the printing system comprise Cyan (C), Magenta (M), Yellow (Y), and black (K), wherein each of the plurality of regions has a colorant limit for printing a subset of the output colors, wherein the colorant limit for at least two of the plurality of regions are different, wherein the colorant limit for each of the plurality of regions is selected to maximize a chroma of the output colors printed by the printing system; and
a processor communicatively coupled to the memory that is configured to receive a print job, to process the print job into rasterized image data using the color transform to convert input colors in the print job to the output colors of the printing system, wherein a colorant amount for printing each subset of the output colors is maintained within the colorant limit of one of the plurality of regions associated with its respective input color,
wherein the processor is configured to transmit the rasterized image data.

2. The apparatus of claim 1, wherein:
the colorant limit for each of the plurality of regions is selected to minimize the colorant amount applied to a medium by the printing system.

3. The apparatus of claim 1, wherein:
the plurality of regions comprises hues of red, green, and blue.

4. The apparatus of claim 1, wherein:
the color space comprises CIELAB.

5. The apparatus of claim 1, further comprising:
a print engine to receive the rasterized image data from the processor, and to print colorants onto a medium.

6. A method, comprising:
storing a color transform that maps input colors in print jobs to output colors of a printing system, wherein each of the input colors are assigned to one of a plurality of regions of a CIELAB color space, wherein the plurality of regions represents secondary colors of the printing system, wherein the secondary colors are represented utilizing two or more colorants of the printing system, wherein the colorants of the printing system comprise Cyan (C), Magenta (M), Yellow (Y), and black (K), wherein each of the plurality of regions has a colorant limit for printing a subset of the output colors, wherein the colorant limit for at least two of the plurality of regions are different, wherein the colorant limit for each of the plurality of regions is selected to maximize a chroma of the output colors printed by the printing system;
receiving a print job;
processing the print job into rasterized image data using the color transform to convert input colors in the print job to the output colors of the printing system, wherein a colorant amount for printing each subset of the output colors is maintained within the colorant limit of one of the plurality of regions associated with its respective input color; and
transmitting the rasterized image data.

7. The method of claim 6, wherein:
the colorant limit for each of the plurality of regions is selected to minimize the colorant amount applied to a medium by the printing system.

8. The method of claim 6, wherein:
the plurality of regions comprises hues of red, green, and blue.

9. The method of claim 6, further comprising:
receiving the rasterized image data by a print engine; and
printing colorants onto a medium by the print engine.

10. A non-transitory computer readable medium embodying programmed instructions which, when executed by a processor, direct the processor to:
store a color transform that maps input colors in print jobs to output colors of a printing system, wherein each of the input colors are assigned to one of a plurality of regions of a CIELAB color space, wherein the plurality of regions represents secondary colors of the printing system, wherein the secondary colors are represented utilizing two or more colorants of the printing system, wherein the colorants of the printing system comprise Cyan (C), Magenta (M), Yellow (Y), and black (K), wherein each of the plurality of regions has a colorant limit for printing a subset of the output colors, wherein the colorant limit for at least two of the plurality of regions are different, wherein the colorant limit for each of the plurality of regions is selected to maximize a chroma of the output colors printed by the printing system;
receive a print job;
process the print job into rasterized image data using the color transform to convert input colors in the print job to the output colors of the printing system, wherein a colorant amount for printing each subset of the output colors is maintained within the colorant limit of one of the plurality of regions associated with its respective input color; and
transmit the rasterized image data.

11. The non-transitory computer readable medium of claim 10, wherein:
the colorant limit for each of the plurality of regions is selected to minimize the colorant amount applied to a medium by the printing system.

12. The non-transitory computer readable medium of claim 10, wherein:
the plurality of regions comprises hues of red, green, and blue.

13. The non-transitory computer readable medium of claim 10 wherein the programmed instructions further direct the processor to:
receive the rasterized image data by a print engine; and
print colorants onto a medium by the print engine.

* * * * *